United States Patent
Jang

(10) Patent No.: US 9,333,834 B2
(45) Date of Patent: May 10, 2016

(54) AIR CONTROLLING SYSTEM OF AIR CONDITIONER FOR VEHICLE

(75) Inventor: Chul-Min Jang, Asan-si (KR)

(73) Assignee: DOOWON CLIMATE CONTROL CO., LTD, Asan-si, Chungcheongnam-do (KR)

( * ) Notice: Subject to any disclaimer, the term of this patent is extended or adjusted under 35 U.S.C. 154(b) by 753 days.

(21) Appl. No.: 13/602,700

(22) Filed: Sep. 4, 2012

(65) Prior Publication Data

US 2013/0288586 A1   Oct. 31, 2013

(30) Foreign Application Priority Data

Apr. 26, 2012   (KR) .......................... 10-2012-0043572

(51) Int. Cl.
  *B60H 1/34*   (2006.01)
  *B60H 1/00*   (2006.01)

(52) U.S. Cl.
  CPC ........ *B60H 1/00857* (2013.01); *B60H 1/00678* (2013.01); *B60H 2001/00707* (2013.01)

(58) Field of Classification Search
  CPC .......................... B60H 1/00857; B60H 1/00678
  See application file for complete search history.

(56) References Cited

U.S. PATENT DOCUMENTS

| | | | | |
|---|---|---|---|---|
| 4,901,788 A | * | 2/1990 | Doi | B60H 1/00842 454/156 |
| 5,156,204 A | * | 10/1992 | Doi | 237/12.3 B |
| 6,009,934 A | * | 1/2000 | Sunaga | B60H 1/00814 454/156 |
| 6,048,263 A | * | 4/2000 | Uchida | B60H 1/00678 454/156 |
| 6,352,102 B1 | * | 3/2002 | Takechi et al. | 237/12.3 B |
| 2003/0205370 A1 | * | 11/2003 | Kim | B60H 1/00064 454/156 |
| 2007/0204434 A1 | * | 9/2007 | Kang et al. | 16/361 |
| 2009/0117841 A1 | * | 5/2009 | Goto et al. | 454/127 |
| 2009/0250193 A1 | * | 10/2009 | Ishikawa | B60H 1/00857 165/61 |
| 2011/0114739 A1 | * | 5/2011 | Misumi et al. | 454/143 |

FOREIGN PATENT DOCUMENTS

| | | |
|---|---|---|
| JP | 08282249 A * | 10/1996 |
| JP | 2004114897 A * | 4/2004 |
| JP | 2008-080889 A | 4/2008 |
| KR | 10-2012-0032235 A | 4/2012 |

OTHER PUBLICATIONS

Suzuki, JP 2008-080889 A English machine translation, Apr. 10, 2008.*

* cited by examiner

*Primary Examiner* — Alissa Tompkins
*Assistant Examiner* — Phillip E Decker
(74) *Attorney, Agent, or Firm* — Paratus Law Group, PLLC

(57) ABSTRACT

Air controlling system of an air conditioner for a vehicle which controls conditioned-air with the temperature controlled in an air-conditioning case to be supplied to each demand part in a vehicle. The air controlling system of an air conditioner for a vehicle is equipped with a rear console duct and can discharge conditioned-air to not only the front seats, but the rear seats in a vehicle.

10 Claims, 6 Drawing Sheets

AIR CONTROLLING SYSTEM OF AIR CONDITIONER FOR VEHICLE

CROSS-REFERENCE TO RELATED APPLICATIONS

This application claims the priority of Korean Patent Application No. 10-2012-0043572, filed on Apr. 26, 2012, in the Korean Intellectual Property Office, the disclosure of which is incorporated herein by reference.

BACKGROUND OF THE INVENTION

1. Field of the Invention

The present invention relates to an air controlling system of an air conditioner for a vehicle which controls conditioned-air with the temperature controlled in an air-conditioning case to be supplied to each demand part in a vehicle, and more particularly, to an air controlling system of an air conditioner for a vehicle which is equipped with a rear console duct and can discharge conditioned-air to not only the front seats, but the rear seats in a vehicle.

2. Description of the Related Art

In general, air conditioners for vehicles include a cooling system that cools the interior of vehicles and a heating system that heats the interior of the vehicles. The cooling system is configured such that refrigerant supplied by operating a compressor cools the interior of a vehicle by exchanging heat with an evaporator and the recirculation/fresh air around while circulating through a condenser, a receiver driver, an expansion valve, and the evaporator and then returning to the compressor. The heating system is configured to heats the interior of a vehicle by making the coolant for the engine flow into a heater core to exchange heat with the recirculation/fresh air around, or by making the coolant for the engine exchange heat with the surrounding air, using an electric heater.

Meanwhile, an air conditioner equipped with a rear console duct discharging conditioned-air even to the rear seats to improve comfort of the passengers in the rear seats has been regularly used in recent years. In this case, a rear console vent into which the conditioned-air discharged toward the upper halves of the passengers in the rear seats flows is formed at the air-conditioning case of the air conditioner and the rear console vent is connected with the rear console duct and can supply the conditioned-air even to the rear seats.

FIGS. 1 and 2 are views showing the configuration of an air conditioner equipped with a rear console vent for a vehicle of the related art, in which FIG. 1 shows a face mode and FIG. 2 shows a foot mode.

As shown in the figures, an evaporator 1 and a heater core 2 are sequentially disposed in an air-conditioning case 10. The evaporator 1 functions to cool inflow air and the heater core 2 is disposed behind the evaporator 1 and functions to heat the air that has passed through the evaporator 1. The cold air that has passed through the evaporator 1 or the warm air that has passed through the heater core 2 is controlled to appropriate temperature by switching of a temp door 3 and the conditioned-air with the temperature controlled, as described above, is discharged to the interior of a vehicle.

The air-conditioning case 10 is equipped with a face vent 11, a defrost vent 12, a front foot vent 13, a rear foot vent 13', and a rear console vent 14 to supply the conditioned-air with the temperature controlled, as described above, to each demand part in the vehicle. The vents 11, 12, 13, 13', and 14 in this configuration supplies the conditioned-air to the demand parts while being controlled to be opened/closed by corresponding doors 20, 25, and 30. That is, the face vent 11 and the rear console vent 14 are controlled to be opened/closed by a vent door 20, the defrost vent 12 is controlled to be opened/closed by a defrost door 25, and the foot vent 13, 13' is controlled to be opened/closed by a foot door 30.

In more detail, as shown in FIG. 1, in a face mode, the vent door 20 is switched to open the face vent 11 and the foot door 30 is switched to close the foot vent 13, 13'. Accordingly, the conditioned-air with the temperature controlled is discharged toward the upper halves of the driver and the passenger in the front seats through the face vent 11 in the vehicle.

In the structure of the air-conditioning case 10 described above, the face vent 11 and the rear console vent 14 interact with each other by a interacting passage 15. Therefore, in the face mode, some of the conditioned-air flowing inside through the vent door 20 that is open flows into the rear console vent 14 through the interacting passage 15 and is then discharged so toward the upper halves of the passengers in the rear seats of the vehicle.

On the other hand, in the foot mode, as shown in FIG. 2, the vent door 20 is switched to close the face vent 11 and the foot door 30 is switched to open the foot vent 13, 13'. Accordingly, the conditioned-air with the temperature controlled is discharged toward the lower halves of the driver and the passenger in the front seats and the lower halves of the passengers in the rear seats through the foot vent 13, 13' in the vehicle.

Further, though not shown, in a bi-level mode, the vent door 20 and the foot door 30 are switched such that the face vent 11 and the foot vent 13, 13' are partially opened. Therefore, the conditioned-air is discharged toward the upper halves and the lower halves of the driver and the passenger in the front seats and the lower halves of the passengers in the rear seats through the face vent 11 and the foot vent 13, 13' that are partially opened, in the vehicle. Further, some of the conditioned-air flowing into the face vent 11 through the vent door 20 that is partially open flows into the rear console vent 14 through the communicating passage 15 and is then discharged toward the upper halves of the passengers in the rear seats in the vehicle.

In the air conditioner described above, however, since the face vent 11 and the foot vent 13, 13' are blocked by a separation wall 16, the air flowing inside through the foot vent 13, 13' cannot flow into the face vent 11, in the foot mode. Therefore, the conditioned-air cannot also flow into the rear console vent 14 that interact with the face vent 11, such that the conditioned-air cannot be discharged through the rear console vent 14.

In particular, when a cooling mode is selected in summer or a heating mode is selected in winter, since warm air or cold air cannot be supplied through the rear console vent 14 in the foot mode, there is a problem in that cooling efficiency in summer or heating efficiency in winter are generally decreased.

SUMMARY OF THE INVENTION

The present invention has been made in an effort to provide an air controlling system of an air conditioner for a vehicle which can generally improve cooling efficiency in summer and heating efficiency in winter by improving the structure such that it is possible to discharge conditioned-air through a rear console vent even in a foot mode.

An exemplary embodiment of the present invention provides an air controlling system of an air conditioner for a vehicle, which includes: an air-conditioning case that has a face vent, a defrost vent, a foot vent, and a rear console vent for discharging conditioned-air with the temperature controlled to each demand part, and where a first interacting passage allowing the face vent and the rear console vent to interact with each other and a second interacting passage allowing the foot vent and the rear console vent to interact with each other are formed; a vent door that selectively opens/closes the face vent; a foot door that selectively opens/closes the foot vent; a rear console door that controls opening/closing of the rear console vent, as the first interacting passage and the second interacting passage selectively open/close, in response to the operation of the foot door; and a door switching control unit that controls switching of the doors in accordance with modes and controls the rear console vent to open through the second interacting passage by switching the rear console door such that the first interacting passage closes and the second interacting passage opens, in a foot mode in which the face vent closes and the foot vent opens.

The door switching control unit may control the rear console vent to open through the first interacting passage by switching the rear console door such that the first interacting passage opens and the second interacting passage closes, in a face mode in which the face vent opens and the foot vent closes.

Further, the door switching control unit may control the rear console vent to open through the first interacting passage and the second interacting passage by switching the rear console door such that the first interacting passage and the second interacting passage partially open, in a bi-level mode in which the face vent and the foot vent partially open.

According to an exemplary embodiment implemented to dealing with modes by the operation described above, the rear console door may include a rotary shaft disposed close to the first interacting passage and the second interacting passage, a switching door disposed rotatably about the center of the rotary shaft and selectively opening/closing the first interacting passage and the second interacting passage, and a connecting rod having one end hinged to the foot door and the other end hinged to the switching door. The rotary shaft may be disposed at the upper end of the switching door and the ends of the connecting rod may be connected to portions lower than the rotational centers of the foot door and the switching door.

In the rear console door described above, when the foot door rotates counterclockwise such that the foot vent opens in response to the foot mode, the switching door with the lower portion pushed by the connecting rod may correspondingly operate counterclockwise, so that the first interacting passage may close and the second interacting passage may open.

Further, when the foot door rotates clockwise such that the foot vent closes in response to the face mode, the switching door with the lower portion pulled by the connecting rod may correspondingly operate clockwise, so that the first interacting passage may open and the second interacting passage may close.

Further, when the foot door rotates counterclockwise or clockwise such that the foot vent partially opens in response to the bi-level mode, the switching door may correspondingly operate counterclockwise (face mode→bi-level mode) or clockwise (foot mode→bi-level mode), that is, in the same direction as the rotational direction of the foot door, while the lower portion is pushed or pulled by the connecting rod, so that the first interacting passage and the second interacting passage may partially open.

According to the air controlling system of an air conditioner for a vehicle according to an exemplary embodiment of the present invention, since it is possible to discharge conditioned-air through the rear console vent not only in a face mode and a bi-level mode, but in a foot mode in which the face vent closes, through the rear console vent, by opening the rear console vent, so that it is possible to generally improve cooling efficiency in summer and heating efficiency in winter. In particular, in the foot mode, it is possible to improve the efficiency of air-conditioning by preventing the conditioned-air from flowing to the face vent, by closing the first interacting passage that allows the face vent and the rear console vent to interact with each other by the rear console door.

Further, as the rear console vent is connected with the foot door to operate together, the first interacting passage that interact with the face vent and the second interacting passage that interact with the foot vent can be selectively opened/closed, so that it is possible to simplify the configuration of the device and efficiently deal with the modes.

BRIEF DESCRIPTION OF THE DRAWINGS

The above and other aspects, features and other advantages of the present invention will be more clearly understood from the following detailed description taken in conjunction with the accompanying drawings, in which:

FIGS. 1 and 2 are views showing the configuration of an air conditioner equipped with a rear console vent for a vehicle of the related art, in which FIG. 1 shows a face mode and FIG. 2 shows a foot mode.

DETAILED DESCRIPTION OF THE INVENTION

Hereinafter, exemplary embodiments of the present invention will be described with reference to accompanying drawings. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Figure 1:
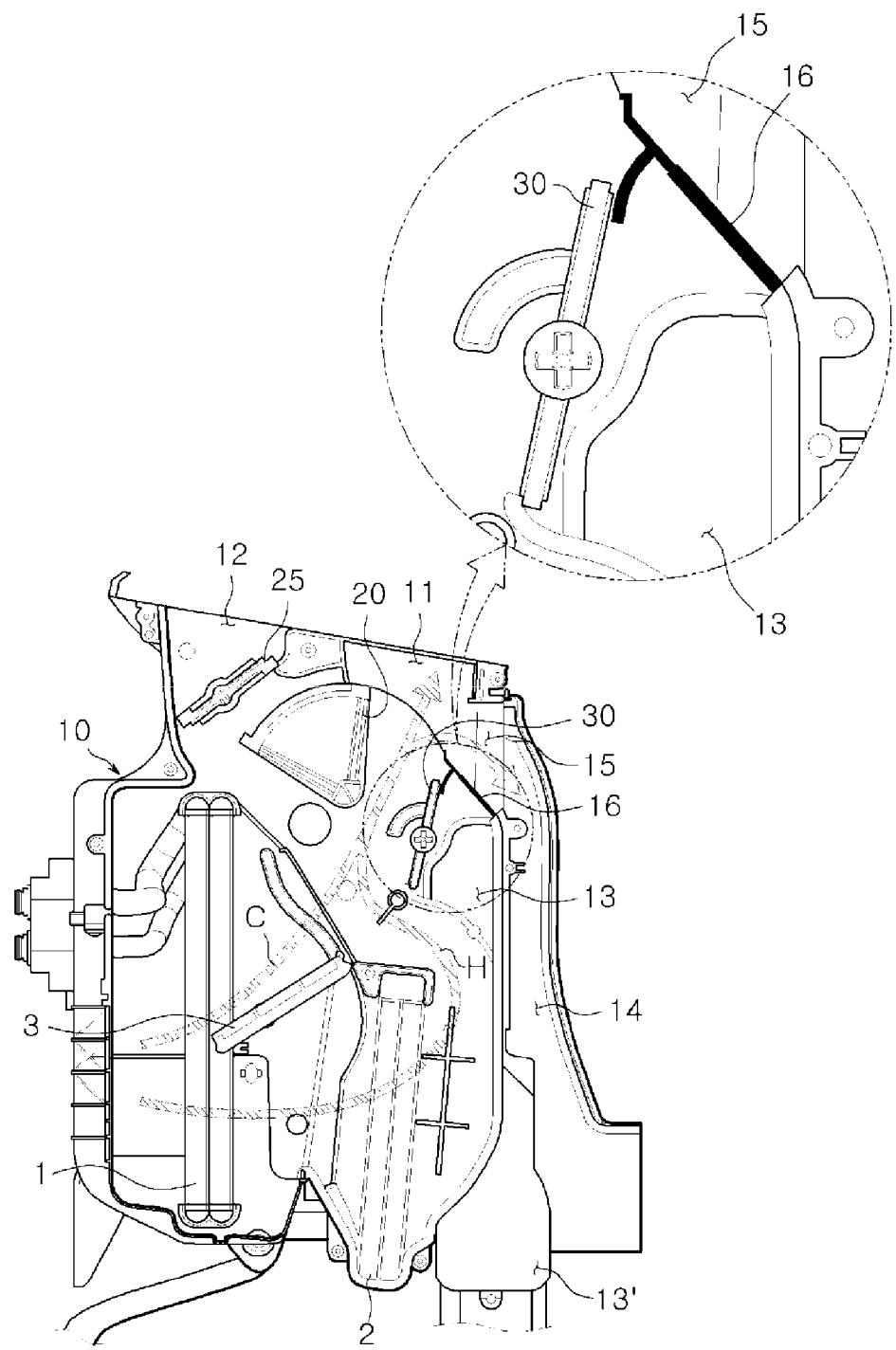
Figure 2:
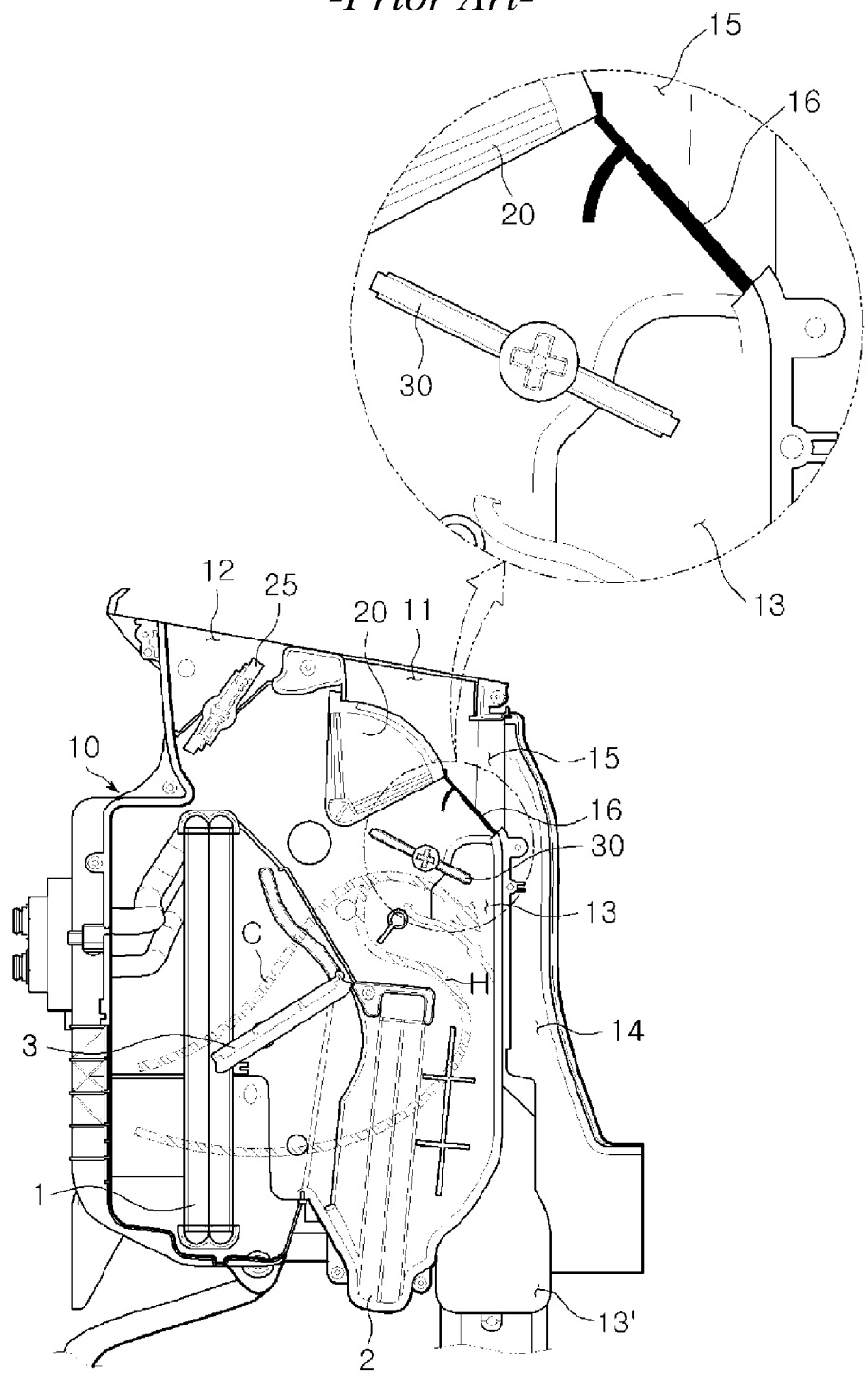
Figure 3:
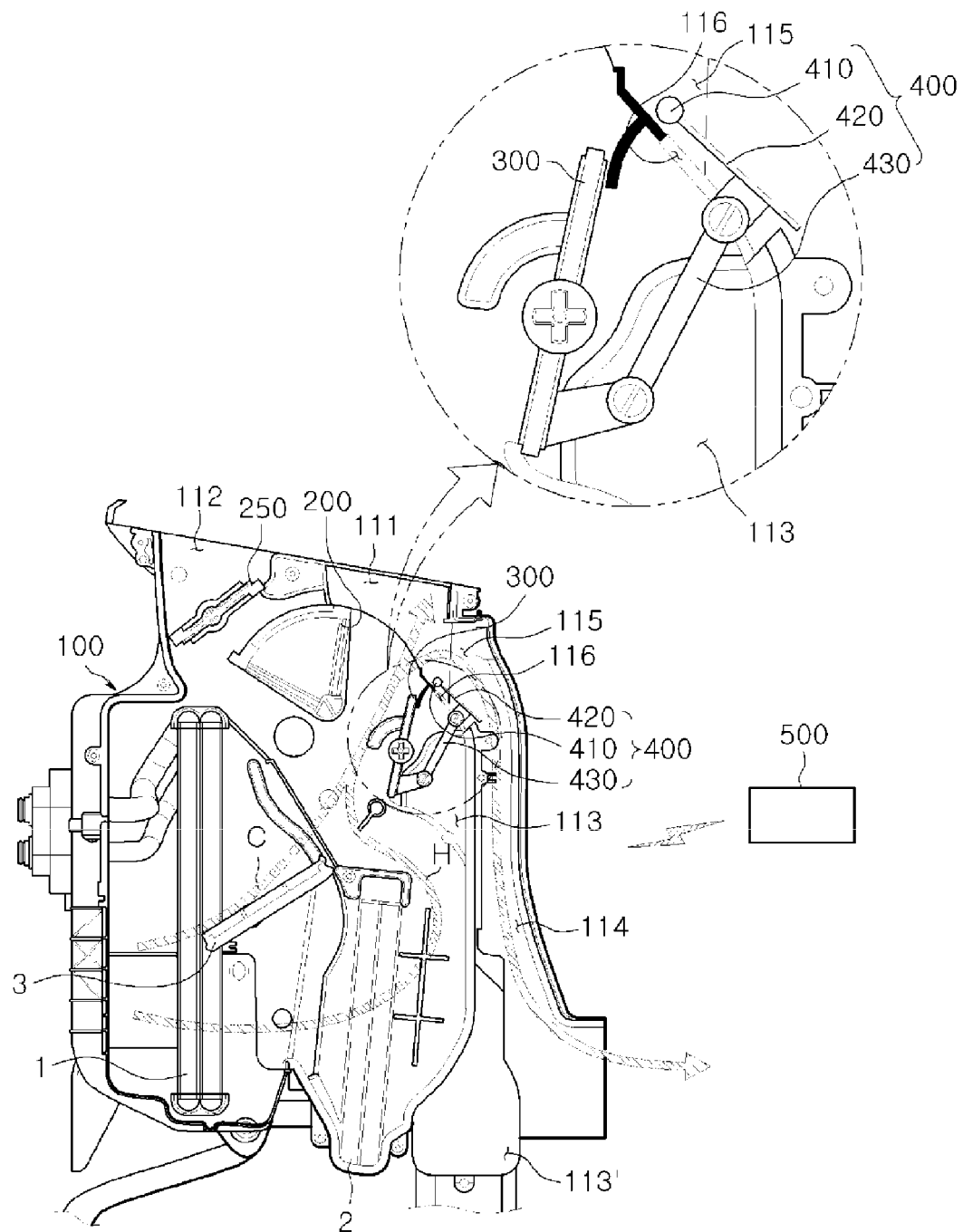
FIG. 3 is a view schematically showing the configuration of an air controlling system of an air conditioner for a vehicle according to an exemplary embodiment of the present invention, in which a face mode is shown.
Figure 4:
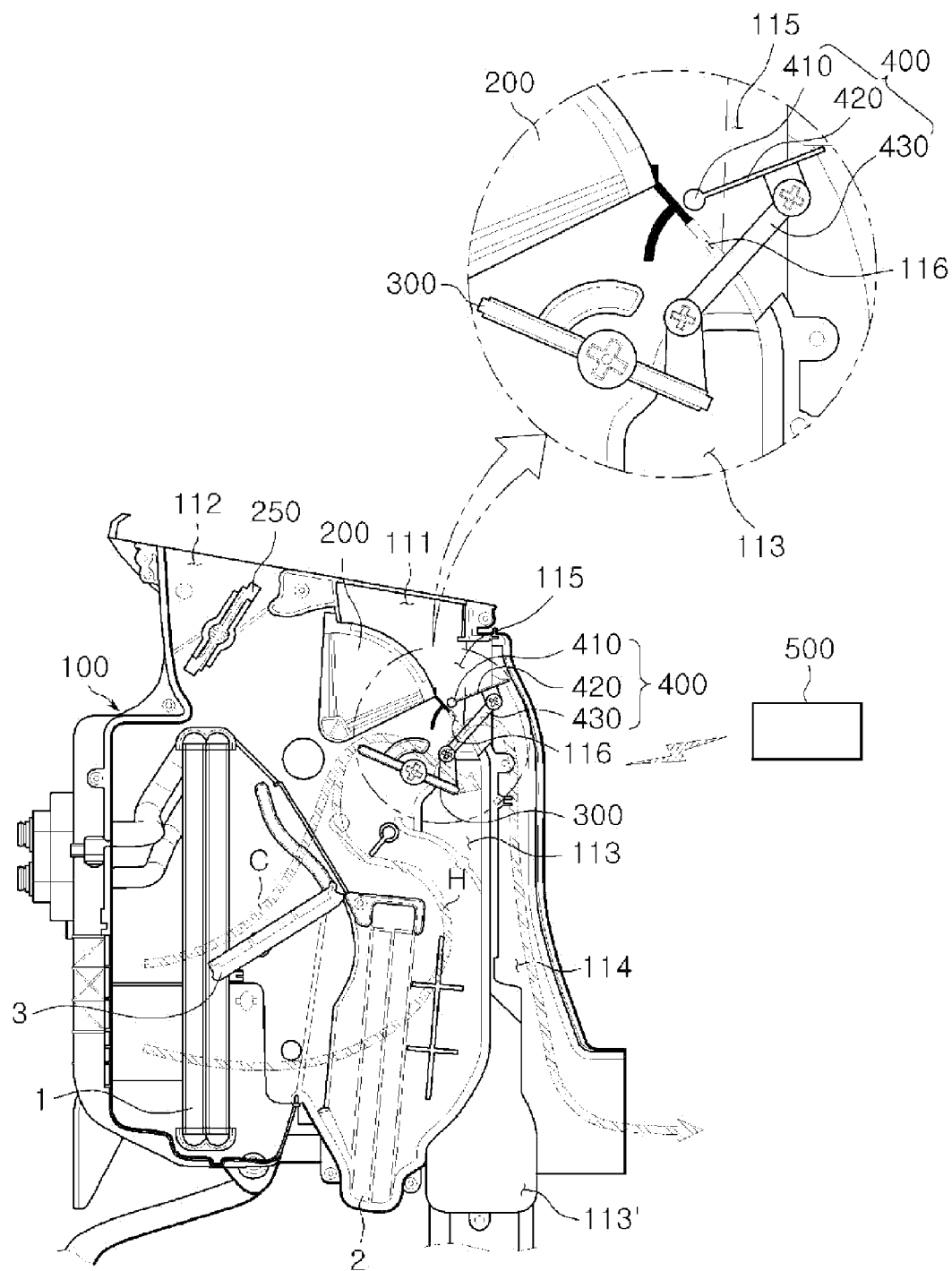
FIG. 4 is a view showing a foot mode of an air controlling system of an air conditioner for a vehicle shown in FIG. 3.
Figure 5:
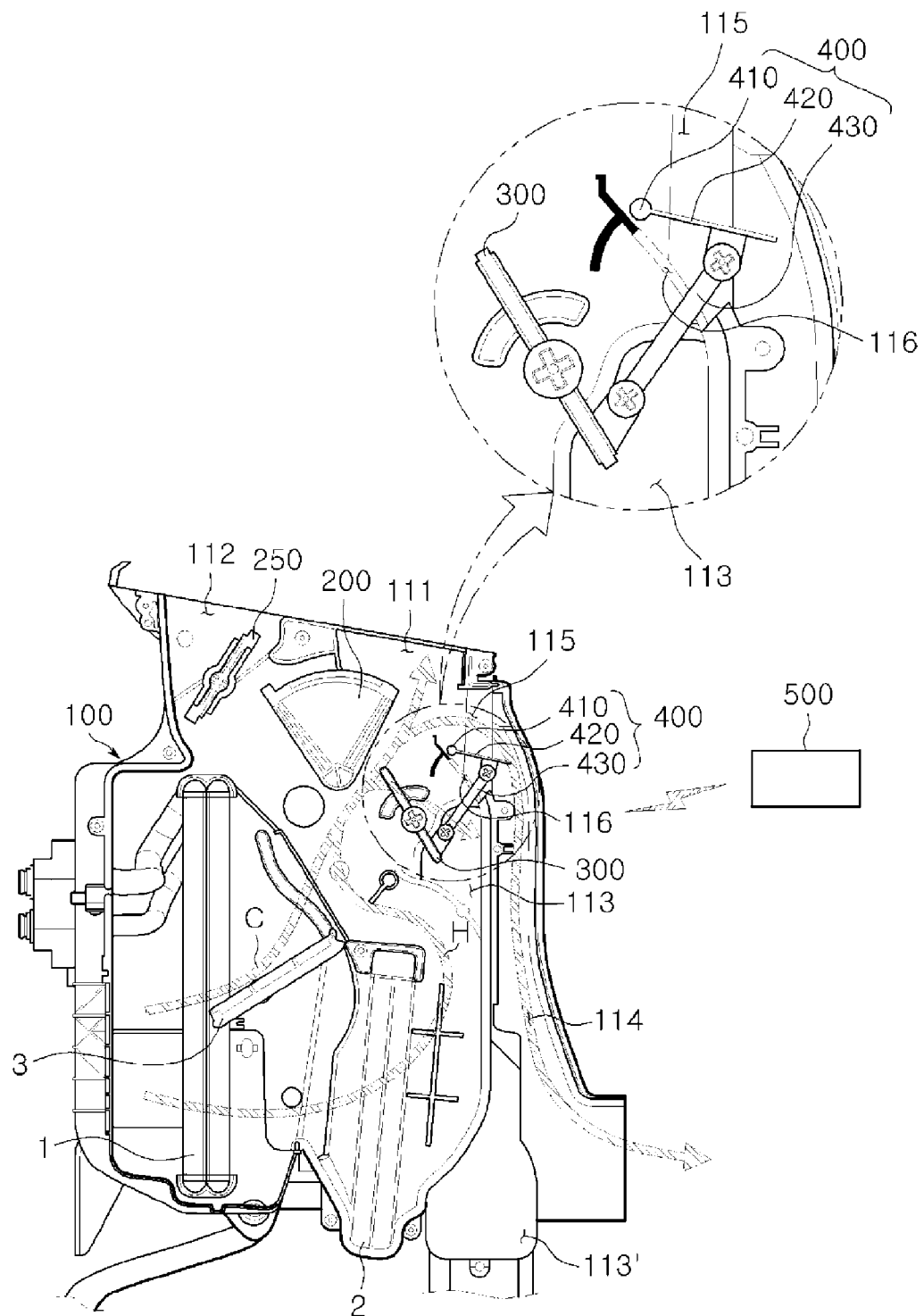
FIG. 5 is a view showing a bi-level mode of the air controlling system of an air conditioner for a vehicle shown in FIG. 3.

FIG. 3 is a view schematically showing the configuration of an air controlling system of an air conditioner for a vehicle according to an exemplary embodiment of the present invention, in which a face mode is shown, FIG. 4 is a view showing a foot mode of an air controlling system of an air conditioner for a vehicle shown in FIG. 3, and FIG. 5 is a view showing a bi-level mode of the air controlling system of an air conditioner for a vehicle shown in FIG. 3. The reference numerals as those shown in FIGS. 1 and 2 indicate the same components that have the same configuration and operation, thus the repeated description is not provided.

Referring to figures, an air controlling system of an air conditioner for a vehicle of the present invention controls the conditioned-air with the temperature controlled in an air-conditioning case 100 to be supplied to each demand part in a vehicle. For this configuration, the air controlling system of an air conditioner for a vehicle includes the air-conditioning case 100, a vent door 200, a foot door 300, a rear console door 400, and a door switching control unit 500. The rear console door 400 makes it possible to discharge the conditioned-air to the rear seats in a vehicle. Further, the detailed configurations and functions of an evaporator 1, a heater core 2, and a temp door 3 shown in the figures are the same as those of the related art, such that the repeated description is not provided and the large distinct configuration is mainly described.

The air-conditioning case 100 has a face vent 111, a defrost vent 112, a front foot vent 113, a rear foot vent 113, and a rear console vent 114 such that the conditioned-air can be discharged to the demand parts. Further, the face vent 111 and the rear console vent 114 interact with each other by a first interacting passage 115. Further, the foot vent 113, 113' and the rear console vent 114 that were blocked by the separation wall 16 (see FIGS. 1 and 2) of the related art communicate with each other by the second interacting passage 116.

In the structure of the air-conditioning case 100 is controlled to open/close by doors 200, 250, 300, and 400 corresponding to the vents 111, 112, 113, 113', and 114. In detail, the face vent 111 is selectively opened/closed by the vent door 200, the defrost vent 112 is controlled to open/close by the defrost door 250, and the foot vent 113, 113' is selectively opened/closed by the foot door 300.

In particular, the rear console door 400 controls the rear console vent 114 to open/close by selectively opening/closing the first interacting passage 115 and the second interacting passage 116. For this configuration, the rear console door 400 operates with the foot door 300 and FIG. 6 shows a perspective view illustrating an exemplary embodiment of the rear console door 400.

Referring to the figure, the rear console door 400 may include a rotary shaft 410 disposed close to the first interacting passage 115 and the second interacting passage 116, a switching door 420 disposed rotatably about the rotary shaft 410 and selectively opening/closing the first interacting passage 115 and the second interacting passage 116, and a connecting rod 430 connecting the foot door 300 with the switching door 420. In this configuration, the connecting rod 430 is hinged to the foot door 300 and the switching door 420 at the ends such that the foot door 300 and the switching door 420 can operate together. In detail, as shown in FIG. 6, the rotary shaft 410 may be disposed at the upper end of the switching door 420 and the ends of the connecting rod 430 may be connected to the portions lower than the rotational centers C1 and C2 of the foot door 300 and the switching door 420.

In the exemplary embodiment of the present invention described above, the door switching control unit 500 controls switching of the doors 200, 250, 300, and 400, in accordance with the modes. The door switching control unit 500 should be interpreted in a broad sense, which includes, though not shown, not only a main controller, but an actuator of which the operation is controlled by the main controller, levers connecting the doors 200, 250, 300, and 400 with the actuator, and a power supply that driving the actuator. The operations of the doors 200, 300, and 400 that are controlled by the door switching control unit 500 to correspond to the modes are described hereafter. However, the defrost mode that is little different from that of the related art is not described.

Figure 6:
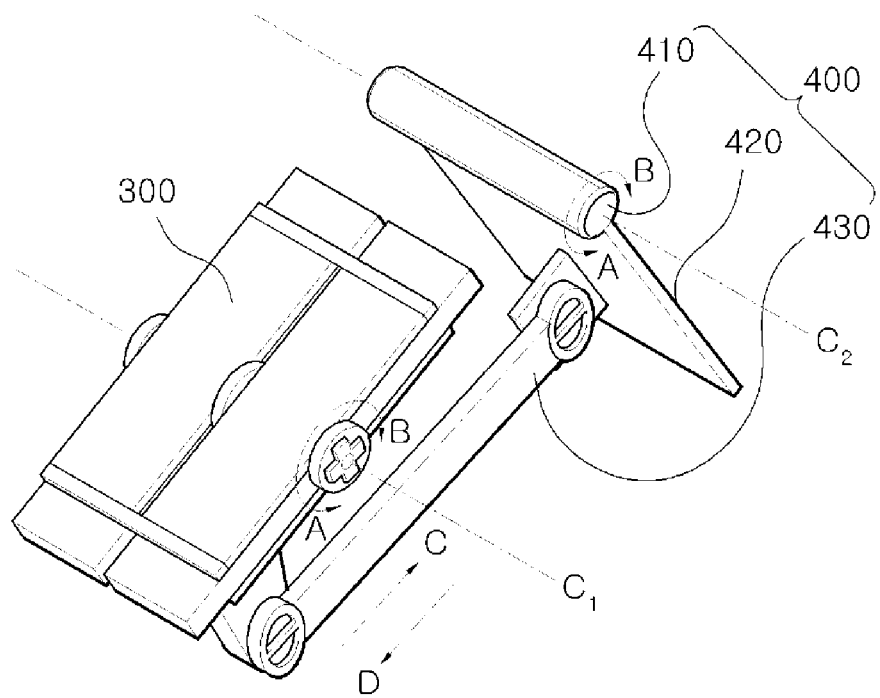
FIG. 6 is a perspective view showing a rear condole door shown in FIGS. 3 to 5.

First, as shown in FIGS. 3 and 6, in the face mode in which the face vent 111 opens and the foot vent 113 closes, the door switching control unit 500 switches the rear console door 400 such that the first interacting passage 115 opens and the second interacting passage 116 closes. Accordingly, the rear console vent 114 opens through the first interacting passage 115.

In detail, when the foot door 300 rotates clockwise (in the direction B) such that the foot vent 113 closes in response to the face mode, the switching door 420 with the lower portion pulled (in the direction D) by the connecting rod 430 correspondingly operates clockwise (in the direction B), the first interacting passage 115 opens and the second interacting passage 116 closes. That is, in the face mode, as in the related art, the rear console vent 114 opens through the first interacting passage 115 that interact with the face vent 111, such that the conditioned-air can be discharged.

Next, as shown in FIGS. 4 and 6, in the foot mode in which the face vent 111 closes and the foot vent 113, 113' opens, the door switching control unit 500 switches the rear console door 400 such that the first interacting passage 115 closes and the second interacting passage 116 opens. Accordingly, the rear console vent 114 opens through the second interacting passage 116.

The operation described above is as follows on the basis of the relation operation of the foot door 300 and the rear console door 400. When the foot door 300 rotates counterclockwise (in the direction A) such that the foot vent 113, 113' opens in response to the foot mode, the switching door 420 with the lower portion pushed (in the direction C) by the connecting rod 430 correspondingly operates counterclockwise (in the direction A), the first interacting passage 115 closes and the second interacting passage 116 opens.

Therefore, even in the foot mode in which the face vent 111 closes, the conditioned-air can be discharged by opening the rear console vent 114. Accordingly, it is possible to improve cooling efficiency in summer and heating efficiency in winter. It is possible to increase the efficiency of air-conditioning as high as possible by blocking the first interacting passage 115 that interact with the face vent 111 by the rear console door 400.

Next, as shown in FIGS. 5 and 6, in the bi-level mode in which the face vent 111 and the foot vent 113, 113' partially open, the door switching control unit 500 switches the rear console door 400 such that the first interacting passage 115 and the second interacting passage 116 partially open. Accordingly, the rear console vent 114 opens through the first interacting passage 115 and the second interacting passage 116 that are partially open.

The operation described above is as follows on the basis of the relation operation of the foot door 300 and the rear console door 400. For example, when the foot door 300 rotates counterclockwise (in the direction A) such that the foot vent 113, 113' partially opens to convert the face mode into the bi-level mode, the switching door 420 with the lower portion pushed (in the direction C) by the connecting rod 430 correspondingly operates counterclockwise (in the direction A), that is, in the same direction as the rotational direction of the foot door 300, such that the first interacting passage 115 and the second interacting passage 116 partially open.

As another example, when the foot door 300 rotates clockwise (in the direction B) such that the foot vent 113, 113' partially opens by partially closing in order to convert the foot mode into the bi-level mode, the switching door 420 with the lower portion pulled (in the direction D) by the connecting rod 430 correspondingly operates clockwise (in the direction B), that is, in the same direction as the rotational direction of the foot door 300, such that the first interacting passage 115 and the second interacting passage 116 partially open.

Therefore, it is possible to discharge the conditioned-air even in the bi-level mode by opening the rear console vent 114 through the first interacting passage 115 that interact with the face vent 111 and the second interacting passage 116 that interact with the foot vent 113, 113', as in the related art.

As described above, according to an air controlling system of an air conditioner for a vehicle according to an exemplary embodiment of the present invention, it is possible to selectively open/close the first interacting passage 115 that interact with the face vent 111 and the second interacting passage 116 that interact with the foot vent 113, 113', by connecting the rear console door 400 with the foot door 300 to be operated with the operation of the foot door 300. Therefore, the present invention has the advantage of simplifying the configuration of the device and efficiently dealing with the modes.

Although the present invention has been described with reference to the exemplary embodiments illustrated in the drawings, those are only examples and may be changed and modified into other equivalent exemplary embodiments from the present invention by those skilled in the art. Therefore, the technical protective region of the present invention should be determined by the scope described in claims.

What is claimed is:

1. An air controlling system of an air conditioner for a vehicle interior, the vehicle interior having a plurality of demand parts, comprising:
    an air-conditioning case having demand parts including a face vent, a defrost vent, a foot vent, a rear console vent for discharging conditioned air with a temperature controlled to each demand part, a first interacting passage introducing a portion of the conditioned air passing through the face vent into the rear console vent, and a second interacting passage introducing a portion of the conditioned air passing through the foot vent into the rear console vent;
    a vent door that opens the face vent and the first interacting passage and makes the air conditioned air flow through the face vent and the first interacting passage and that closes the face vent and the first interacting passage and prevents the conditioned air from flowing into the face vent and the first interacting passage;
    a foot door that opens and closes the foot vent;
    a rear console door connected to and rotating together with the foot door; and
    a door switching control unit that controls switching of the doors in accordance with selected modes, wherein the door switching control unit is configured to control, in response to a foot mode, the rear console door to open the second interacting passage while closing the first interacting passage when the door switching control unit controls the foot door to open the foot vent to make the conditioned air passing through the foot vent flow into the rear console vent through the second interacting passage, thereby improving cooling and heating efficiency by enabling conditioned air to flow through the rear console vent when the air controlling system is in the foot mode in which the face vent is closed which would otherwise also close the rear console vent.

2. The air controlling system of claim 1, wherein the door switching control unit controls the rear console vent to open through the first interacting passage by switching the rear console door such that the first interacting passage opens and the second interacting passage closes, in a face mode in which the face vent opens and the foot vent closes.

3. The air controlling system of claim 2, wherein the rear console door includes a rotary shaft disposed at a vicinity of the first interacting passage and the second interacting passage, a switching door disposed rotatably about the center of the rotary shaft and selectively opening/closing the first interacting passage and the second interacting passage, and a connecting rod having one end hinged to the foot door and the other end hinged to the switching door.

4. The air controlling system of claim 1, wherein the door switching control unit controls the rear console vent to open through the first interacting passage and the second interacting passage by switching the rear console door such that the first interacting passage and the second interacting passage partially open, in a bi-level mode in which the face vent and the foot vent partially open.

5. The air controlling system of claim 4, wherein the rear console door includes a rotary shaft disposed at a vicinity of the first interacting passage and the second interacting passage, a switching door disposed rotatably about the center of the rotary shaft and selectively opening/closing the first interacting passage and the second interacting passage, and a connecting rod having one end hinged to the foot door and the other end hinged to the switching door.

6. The air controlling system of claim 1, wherein the rear console door includes a rotary shaft disposed at a vicinity of the first interacting passage and the second interacting passage, a switching door disposed rotatably about the center of the rotary shaft and selectively opening/closing the first interacting passage and the second interacting passage, and a connecting rod having one end hinged to the foot door and the other end hinged to the switching door.

7. The air controlling system of claim 6, wherein the rotary shaft is disposed at the upper end of the switching door and the ends of the connecting rod are connected to portions lower than the rotational centers of the foot door and the switching door.

8. The air controlling system of claim 7, wherein when the foot door rotates counterclockwise such that the foot vent opens in response to the foot mode, the switching door with the lower portion pushed by the connecting rod correspondingly operates counterclockwise, so that the first interacting passage closes and the second interacting passage opens.

9. The air controlling system of claim 7, wherein when the foot door rotates clockwise such that the foot vent closes in response to a face mode, the switching door with the lower portion pulled by the connecting rod correspondingly operates clockwise, so that the first interacting passage opens and the second interacting passage closes.

10. The air controlling system of claim 7, wherein when the foot door rotates counterclockwise or clockwise such that the foot vent partially opens in response to a bi-level mode, the switching door correspondingly operates in the same direction as the rotational direction of the foot door, while the lower portion is pushed or pulled by the connecting rod, so that the first interacting passage and the second interacting passage partially open.

* * * * *